(12) United States Patent
Marche

(10) Patent No.: US 7,823,624 B2
(45) Date of Patent: Nov. 2, 2010

(54) HEAT EXCHANGER, PROPULSION UNIT, AND AIRCRAFT COMPRISING SUCH A PROPULSION UNIT

(75) Inventor: Herve Marche, Roquettes (FR)

(73) Assignee: Airbus France, Toulouse (FR)

( * ) Notice: Subject to any disclaimer, the term of this patent is extended or adjusted under 35 U.S.C. 154(b) by 996 days.

(21) Appl. No.: 11/491,648

(22) Filed: Jul. 24, 2006

(65) Prior Publication Data

US 2007/0034351 A1    Feb. 15, 2007

(30) Foreign Application Priority Data

Jul. 28, 2005    (FR) .................................. 05 52344

(51) Int. Cl.
*B60H 3/00* (2006.01)
*B60H 1/00* (2006.01)
*F28D 7/02* (2006.01)
*F04D 31/00* (2006.01)
*F01D 1/00* (2006.01)
*F01D 25/08* (2006.01)
*B64D 33/02* (2006.01)
*B64D 33/10* (2006.01)

(52) U.S. Cl. .............................. 165/44; 165/41; 165/51; 165/164; 415/116; 415/117; 415/177; 244/53 B; 244/57

(58) Field of Classification Search .................... 165/41, 165/44, 51, 164; 415/116, 117, 177; 244/53 B, 244/57, 118.5

See application file for complete search history.

(56) References Cited

U.S. PATENT DOCUMENTS

| 2,628,482 | A | | 2/1953 | Burgess |
| 4,437,627 | A | | 3/1984 | Moorehead |
| 5,513,893 | A | * | 5/1996 | Nakata et al. ............ 296/180.1 |
| 5,729,969 | A | | 3/1998 | Porte |
| 2003/0218096 | A1 | * | 11/2003 | Marche .................... 244/118.5 |

FOREIGN PATENT DOCUMENTS

| DE | 3320012 A1 | 12/1984 |
| EP | 0481134 A | 4/1992 |
| FR | 2800706 A | 5/2001 |
| FR | 2839948 A | 11/2003 |
| GB | 620674 A | 3/1949 |
| JP | 02171543 A | 7/1990 |

* cited by examiner

*Primary Examiner*—Henry Yuen
*Assistant Examiner*—Travis Ruby
(74) *Attorney, Agent, or Firm*—Patterson Thuente Christensen Pedersen, P.A.

(57) ABSTRACT

A heat exchanger comprising a main heat exchange housing, a cooling air inlet line and a hot air inlet line to bring a cooling airflow and a hot airflow in the main housing. A heat pre-exchanger is disposed upstream from the main housing, the heat pre-exchanger being able to be crossed by the cooling airflow and the hot airflow prior to the main housing. The invention also relates to a propulsion unit and an aircraft comprising such a heat exchanger.

17 Claims, 3 Drawing Sheets

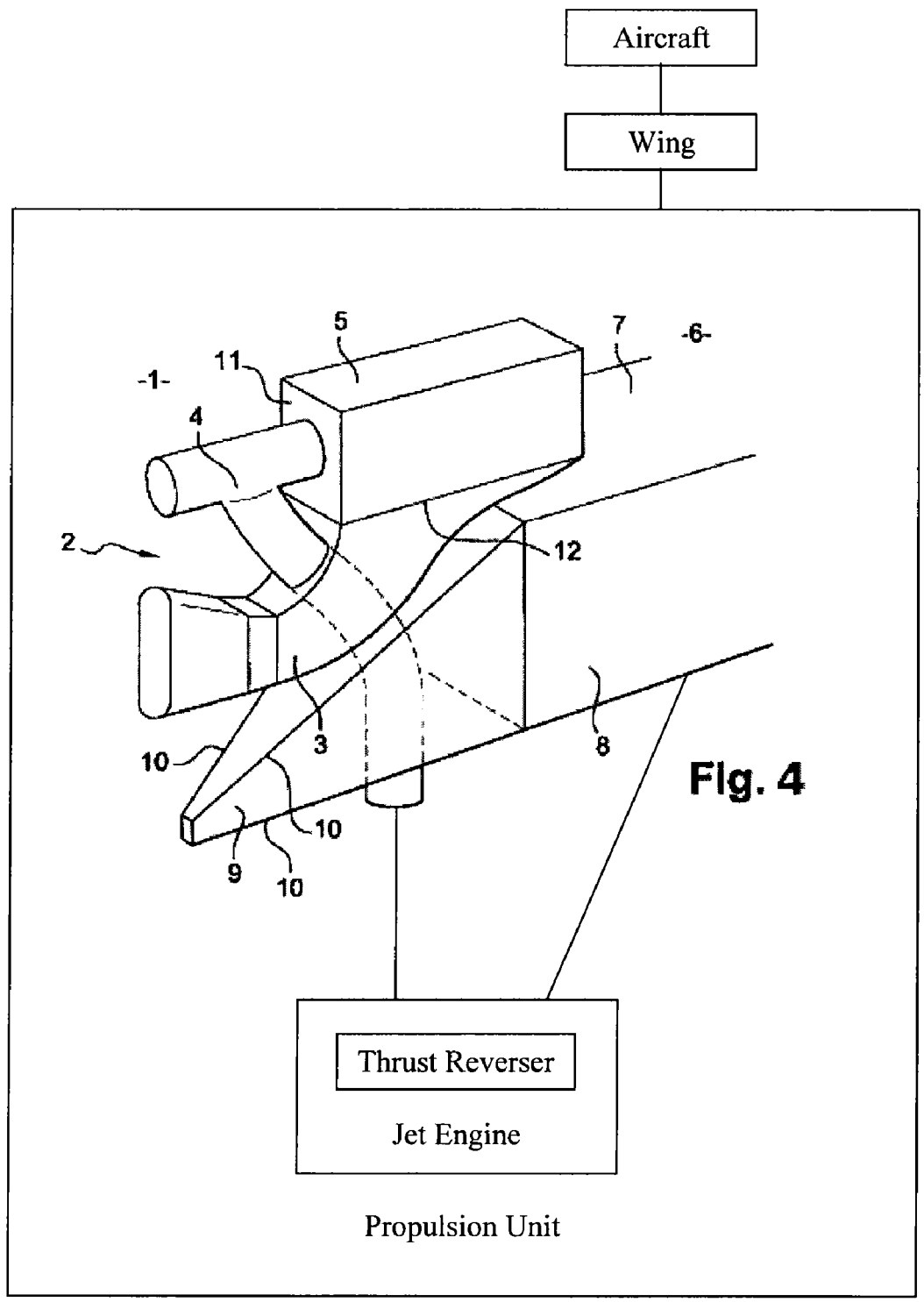

HEAT EXCHANGER, PROPULSION UNIT, AND AIRCRAFT COMPRISING SUCH A PROPULSION UNIT

RELATED APPLICATION

This application claims priority to French Application No. FR 05 52344 filed Jul. 28, 2005.

TECHNICAL FIELD

The invention relates to a heat exchanger that is able to cool, at least partially, a flow of very hot air by means of a flow of cold air. More particularly, the invention relates to a position of cold air and hot air inlet lines with relation to a heat exchanger housing. The invention also relates to a propulsion unit comprising a turbojet engine and such a heat exchanger. The invention also relates to an aircraft comprising at least one propulsion unit according to the invention.

BACKGROUND OF THE INVENTION

In the aeronautics field, utilizing hot air, taken at the location of the turbojet engine compressors of an aircraft to supply the air conditioning circuits of said aircraft, is known. As the air conditioning circuits are destined for the cockpit and passenger cabins, it is necessary to cool this hot air before injecting the air into said circuits.

For this purpose, a heat exchanger is used, in which a flow of hot air, taken at the level of a turbojet engine compressor, crosses a flow of cold air, taken at the outlet of a turbojet engine fan. The flow of cold air and the flow of hot air circulates inside a heat exchanger housing in such a way that a calorific exchange may take place. At the outlet of the heat exchanger housing, the hot airflow is partially cooled and sent in the direction of the air conditioning circuit. As for the cold airflow, as it has allowed cooling, it is discharged to the outside.

A major disadvantage of current heat exchangers is their bulkiness. In fact, the heat exchanger is generally disposed on an upper face of an attaching mast that connects the turbojet engine to the aircraft wing system. Because of the position of the mast above the turbojet engine, the cold air and hot air inlet lines must cross the viable structure of the mast. The passage of cold air and hot air inlet lines in the viable structure, or structure box, of the mast necessitates reinforcement of the mast structure at the level of the passage of said air inlet lines. This tends to notably weigh down the structure.

To mitigate this disadvantage, it is possible to arrange cold air and hot air inlets in such a way that the hot air inlet line crosses a pyramid of the mast, which is a hollow structure situated in front of the mast structure box. The cold air inlet line passes above the pyramid of the mast and therefore does not cross said mast.

However, such a solution is difficult to implement. In fact, the hot air inlet line is situated under the cold air inlet line, while the cold air and hot air inlet lines respectively penetrate in the heat exchanger housing by the lower face and the front face of said housing. Therefore, the cold air inlet line may impede the passage of the hot air inlet line.

SUMMARY OF THE INVENTION

In the invention, one seeks to find a solution allowing the total weight of the heat exchanger, as well as the bulkiness of said heat exchanger, to be reduced.

For this purpose, the invention proposes a heat exchanger in which the flow of cold air and the flow of hot air cross each other not only in the heat exchanger housing, but also upstream of said housing, in such a way that a prior heat exchange takes place. The hot air inlet channel crosses the cold air inlet channel, or vice-versa, before the two channels penetrate in the heat exchanger housing. Therefore, bulkiness of the heat exchanger upstream from the housing is reduced since the two air inlet channels no longer cross each other, but one traverses the other. Upstream is understood to refer to the direction of the airflows in the air inlet channels. In addition, pre-exchange of heat is allowed between the cold and hot airflows. It is therefore possible to reduce the volume of the heat exchanger housing. Therefore, bulkiness of the heat exchanger housing above the connection mast of the turbojet engine to the aircraft wing system is reduced. This physical crossing of cold and hot airflows, upstream from the housing in which the main calorific exchange takes place, may be done by the simple physical crossing of the piping forming the cold and hot air inlet channels, but also by means of a secondary housing. The secondary housing has, for example, a structure similar to that of the main housing, and may be in a reduced size with relation to said main housing. Furthermore, it is possible to contemplate that the secondary housing and the main housing have reduced sizes with relation to a conventional housing from the prior art. For example, it is possible to use a main housing and a secondary housing such that the cumulative volume of these two housings corresponds to the volume of a conventional housing from the prior art.

Therefore, the object of the invention is a heat exchanger comprising a main heat exchange housing, a cooling air inlet line and a hot air inlet line to bring a cooling airflow and a hot airflow in the main housing, characterized in that the invention comprises a heat pre-exchanger disposed upstream from the main housing in such a way that the cooling airflow and the hot airflow cross the heat pre-exchanger before the main housing.

Upstream is understood to refer to the direction of the cooling and hot airflows in the air inlet lines. The pre-exchanger is therefore disposed between the cooling airflow source and the main housing.

According to the examples of embodiment of the heat exchanger of the invention, said exchanger may comprise part or all of the following additional characteristics:

- The pre-exchanger comprises a section of the cooling air inlet line and a section of the hot air inlet line.
- The section of the hot air inlet line crosses the section of the cooling air inlet line.
- The section of the cooling air inlet line crosses the section of the hot air inlet line.
- The pre-exchanger comprises a secondary heat exchange housing in which the cooling airflow and the hot airflow may circulate.
- The cooling air inlet line penetrates in the main housing by a lower face of said main housing.
- The hot air inlet line penetrates in the main housing by a front face of said main housing.

The invention also relates to a propulsion unit for aircraft, comprising a turbojet engine and such a heat exchanger according to the invention.

According to the examples of embodiment of the propulsion unit according to the invention, said exchanger may comprise part or all of the following additional characteristics:

- The main housing of the heat exchanger is fixed to an upper face of a connection mast to fix the turbojet engine to the wing system of an aircraft.

The hot air inlet line crosses the pyramid of the mast, the cooling air inlet line passing above said pyramid.

The cooling air inlet line samples the cooling airflow in an area of bifurcation of the airflows in the turbojet engine, upstream from the turbojet engine thrust reverser covers.

The invention also relates to an aircraft comprising at least one propulsion unit according to the invention.

BRIEF DESCRIPTION OF THE DRAWINGS

The invention will be better understood upon reading the following description and examining the accompanying figures. The figures are presented for indication purposes only and in no way limit the invention. The figures show:

FIG. 4 is a schematic representation of an aircraft, wing and propulsion unit according to an example embodiment of the invention.

DETAILED DESCRIPTION OF THE INVENTION

Figure 1:
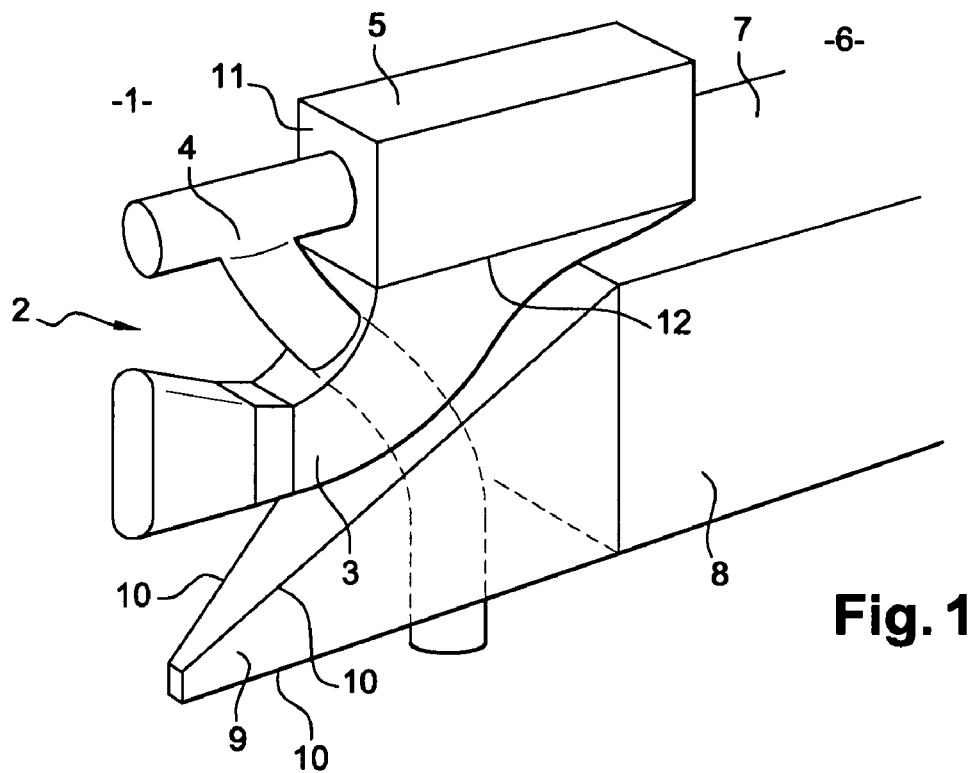
FIG. 1 is a schematic representation of a heat exchanger according to a first example of embodiment of the invention.

FIG. 1 represents a heat exchanger 1 according to the invention comprising a cooling air inlet line 3, a hot air inlet line 4, a main housing 5 and a heat pre-exchanger 2. The heat pre-exchanger 2 is comprised of a physical crossing between the cooling air inlet line 3 and the hot air inlet line 4, upstream from the main housing 5. More precisely, the cooling air inlet line 3, of larger section, is crossed by the hot air inlet line 4, of smaller section. In another example of embodiment, it is conversely possible that the cooling air inlet line 3 crosses the hot air inlet line 4.

The main housing 5, in which a cooling airflow and a hot airflow are designed to circulate in order to at least partially cool the hot airflow, has a generally rectangular form. The main housing 5 is partially integral with an upper face 7 of a structure box 8 of a mast 6. The mast 6 allows a turbojet engine to be fixed on the aircraft wing system (not represented). The mast 6 comprises the structure box 8 as well as a pyramid 9. The pyramid 9 forms the front end of the mast 6, that is, the end of the mast 6 directed towards the front of the aircraft. The structure box 8 is a viable structure of the mast 6. The pyramid 9 is a hollow structure delimited by four arms 10 (three arms visible in FIG. 1). The heat exchanger housing of the prior art is completely connected to the upper face of the mast, that is, the entire surface of the lower face of the housing is integral with the mast. In the example according to the invention, the main housing 5 is slightly in front on the structure box 8 of the mast, in such a way that only a partial surface of the lower face 12 of the main housing 5 is integral with the upper face 7 of the mast 6 structure box 8. Lower face is understood to refer to the face of the housing 5 directed towards the upper face 7 of the mast 6 structure box 8. The front part of the main housing 5 is in front of the mast 6 structure box 8, above the pyramid 9.

A front face 11 of the housing 5 receives the hot air inlet line 4. Front face is understood to refer to the face of the housing 5 directed towards the front of the aircraft. The hot air inlet line 4 takes the hot air in the turbojet engine, situated under the mast 6. Therefore, the hot air inlet line 4 must cross the mast 6 to be able to bring the hot airflow in the main housing 5 of the heat exchanger 1 situated above the mast 6. For this purpose, the hot air inlet line crosses the hollow inner volume of the pyramid 9.

The lower face 12 of the main housing 5 receives the cooling air inlet line 3. The cooling air inlet line 3 takes the cooling airflow at the level of the turbojet engine fan (not represented). The cooling airflow is, for example, taken frontally by the cooling air inlet line, in order to be able to arrive at the face on the main housing 5. The cooling air inlet line 3 passes above the pyramid 9 of the mast 6, and therefore does not cross said mast 6.

Figure 2:
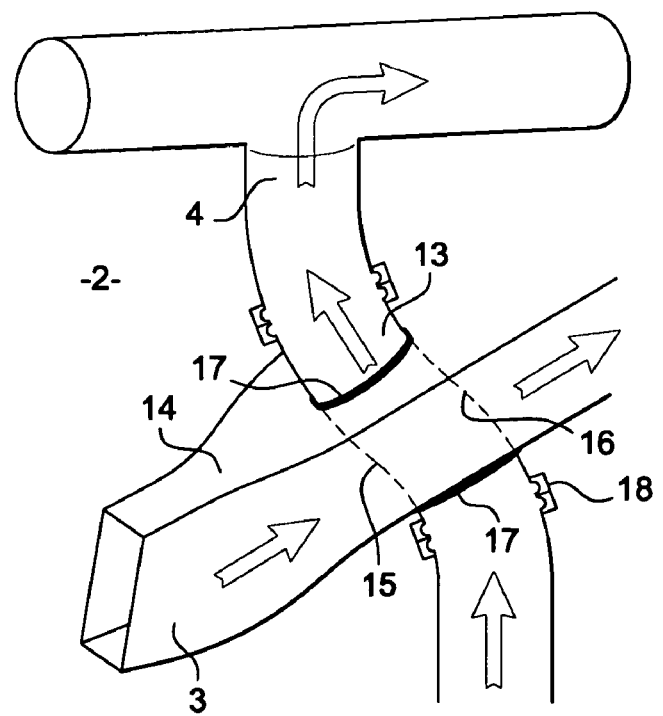
FIG. 2 is an enlargement of FIG. 1 at the level of the crossing between the cooling air inlet line and the hot air inlet line.

In FIG. 2 the pre-exchanger 2 may be seen in further detail. A section 13 of the hot air inlet line 4 crosses a section 14 of the cooling air inlet line 3. The hot airflow and cold airflow cross each other perpendicularly to each other. The outer wall 15 of section 13 of the hot air inlet line 4 is lapped by the cooling airflow crossing section 11 of the cooling air inlet line 3. Therefore, the hot airflow crossing section 13 of the hot air inlet line 4 is partially cooled by the cooling airflow. More precisely, the hot air in contact with the inner wall 16 of section 13 of the hot air inlet line 4 is cooler than the hot air situated inside section 13 of the hot air inlet line 4. The magnitude of the calorific exchange between the hot airflow and the cooling airflow in the pre-exchanger 2 particularly depends on the pressure of these two flows in the hot air 4 and cooling air 3 inlet lines.

To make such a pre-exchanger 2, it is possible to arrange an opening crossing section 14 of the cooling air inlet line 3, wherein the diameter is at least equal to the outer diameter of the hot air inlet line 4. The hot air inlet line 4 is then introduced in the opening in such a way that section 13 of the hot air inlet line 4 is housed in section 14 of the cooling air inlet line 3.

Section 13 of the hot air inlet line 4 may also be an independent added tube. The hot air inlet line 4 is then formed of at least three sections, the central section forming section 13 of the hot air inlet line 4. It is also possible to make a hot air inlet line 4 in two sections or more. The connection between the different sections of the hot air inlet line 4 may be made by any means ensuring fluid leakproofness. For example, leakproof clips 18 are utilizied. A leakproof clip 18 surrounds the ends of the adjacent sections of the hot air inlet line 4 and clasps said sections in a leakproof manner.

Section 13 of the hot air inlet line 4 is, for example, soldered to the wall of section 14 of the cooling air inlet line 3 bordering the crossing opening in order to be held in position in said crossing opening. In addition, the solders 17 may ensure leakproofness of section 14 of the cooling air inlet line 3. The cooling airflow therefore cannot go outside of the cooling air inlet line 3 at the level of the connection between the two sections 13 and 14. It is also possible to use seals instead of or in addition to the solders 17 to guarantee leakproofness.

In the example represented in FIG. 1, the cooling air inlet line 3 is substantially parallel to the mast 6, which particularly allows the cooling airflow to be brought to the main housing 5 without the cooling air inlet line 3 crossing the mast 6. This is particularly possible by taking the cooling airflow frontally in the turbojet engine, for example at the level of the area of bifurcation of the flows in the turbojet engine, upstream from the thrust reverser covers, in such a way that the cooling airflow is taken from the face on the turbojet engine. Of course, in other examples of embodiment, the cooling airflow may be taken laterally, as is ordinarily done in the prior art, at the level of one of the two turbojet engine reverser covers.

Figure 3:
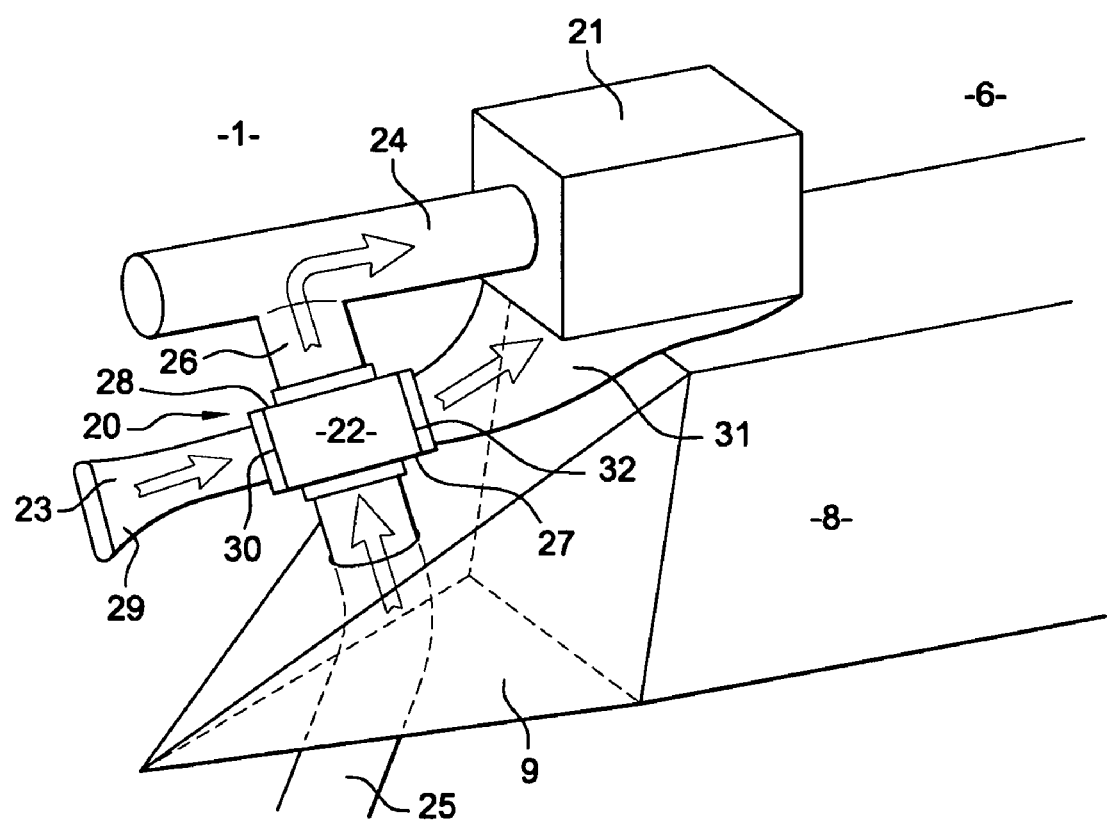
FIG. 3 is a schematic representation of a heat exchanger according to a second example of embodiment of the invention.

In FIG. 3 is represented a second example of embodiment of a heat exchanger 1 according to the invention.

The heat exchanger 1 comprises a cooling air inlet line 23, a hot air inlet line 24, a main housing 21, and a pre-exchanger 20 disposed upstream from the main housing 20.

The heat pre-exchanger 20 comprises a secondary housing 22 in which the cooling airflow and the hot airflow circulate perpendicularly to each other, before circulating in the main housing 21. The secondary housing 22 has a generally rectangular form.

A lower section 25 of the hot air inlet line 24 brings the hot airflow from the turbojet engine to the secondary housing 22. Lower section 25 is understood to refer to the section of the hot air inlet line 24 situated under the secondary housing 22. The lower section 25 of the hot air inlet line 24 opens onto a lower face 27 of the secondary housing 22. An upper section 26 of the hot air inlet line 24 brings the hot airflow from the secondary housing 22 to the main housing 21. Upper section 26 is understood to refer to the section of the hot air inlet line 24 situated above the secondary housing 22. The upper section 26 of the hot air inlet line 24 emerges from the secondary housing 22 by an upper face 28 of said secondary housing 22, opposed to the lower face 25. The upper face 28 of said secondary housing 22 is the face directed toward the main housing 21. The hot airflow therefore vertically crosses the secondary housing 22.

A front section 29 of the cooling air inlet line 23 brings the cooling airflow from the turbojet engine to the secondary housing 22. Front section is understood to refer to the section of the cooling air inlet line 23 situated upstream from the second housing 22. The front section 29 of the cooling air inlet line 23 opens on a front face 30 of the secondary housing 22. A rear section 31 of the cooling air inlet line 23 brings the cooling airflow from the secondary housing 22 to the main housing 21. Rear section is understood to refer to the section of the cooling air inlet line 23 situated downstream from the secondary housing 22. The rear section 31 of the cooling air inlet line 23 emerges from the secondary housing 22 by a rear face 32 of said secondary housing 22. The cooling airflow therefore horizontally crosses the secondary housing 22.

The cooling airflow crosses the secondary housing 22 from front to rear, while the hot airflow crosses the secondary housing 22 from bottom to top. Conversely, the hot airflow crosses the main housing 21 from front to rear, while the cooling airflow crosses the main housing 21 from bottom to top. The cooling airflow and the hot airflow are therefore perpendicular to each other in the secondary housing 22 and in the main housing 21.

Leakproofness between different sections 25, 26, 29, 31 of the hot air 24 and the cooling air 23 inlet lines and the secondary housing 22 may be ensured by any means, particularly by using, in the same way as in the first example of embodiment, solders and/or seals.

The main housing 21 may have a reduced volume with relation to conventional heat exchanger housings because of the presence of this pre-exchanger 20. In fact, a significant heat exchange has already taken place in the secondary housing 22. By reducing the size, and therefore the volume of the main housing 21, the bulkiness of the heat exchanger above the mast 6 is reduced, and the aerodynamic drag due to this heat exchanger 1 is therefore reduced.

An aircraft generally comprises two propulsion units, each comprising a turbojet engine, respectively disposed under each wing of the aircraft wing system. It is possible to provide each aircraft propulsion unit, or one of the two, with a heat exchanger 1 according to the invention. Certain aircraft equipped with two propulsion units under each wing of the wing system also exist. In this case, it is possible to provide one, two, three or four propulsion units with a heat exchanger 1 according to the invention.

The invention claimed is:

1. A heat exchanger comprising:
a main heat exchange housing in a rectangular form, a first side of the main heat exchange housing being at least partially integral with a connection mast;
a cooling air inlet line and a hot air inlet line, wherein the hot air inlet line extends perpendicularly through the cooling air inlet line to form a heat pre-exchanger upstream of the main heat exchange housing, and wherein the hot air inlet line extends through a pyramid portion of the connection mast upstream of the heat pre-exchanger;
a heat pre-exchanger cooling air outlet line extending to a cooling air inlet of the main heat exchange housing, the cooling air inlet of the main heat exchange housing positioned on the first side of the main heat exchange housing; and
a heat pre-exchanger hot air outlet line extending to a hot air inlet of the main heat exchange housing, the hot air inlet of the main heat exchange housing positioned on a second side of the main heat exchange housing perpendicular to the first side such that hot airflow from the hot air inlet of the main heat exchange housing and cooling airflow from the cooling air inlet of the main heat exchange housing cross at approximately a right angle within the main heat exchange housing.

2. The heat exchanger of claim 1, further comprising a heat pre-exchanger housing, wherein the hot air inlet line extends through the cooling air inlet line within the heat pre-exchanger housing.

3. The heat exchanger of claim 2, wherein a cooling airflow and a hot airflow circulate perpendicularly in the heat pre-exchanger housing.

4. The heat exchanger of claim 1, wherein the connection mast comprises the pyramid portion and a structure box portion, and wherein a first portion of the first side of the main heat exchange housing is partially integral with an upper face of the structure box portion.

5. The heat exchanger of claim 4, wherein a second portion of the main heat exchange housing is positioned in front of the structure box portion and over the pyramid portion.

6. The heat exchanger of claim 1, wherein the cooling air inlet line passes above the pyramid portion.

7. The heat exchanger of claim 1, wherein the hot air inlet line comprises at least two sections.

8. The heat exchanger of claim 7, wherein the hot air inlet line comprises at least three sections, a central section of the hot air inlet line extending through the cooling air inlet line.

9. The heat exchanger of claim 7, wherein the at least two sections are coupled by fluid-leakproof clips.

10. The heat exchanger of claim 1, wherein a diameter of an opening crossing section of the cooling air inlet line is at least equal to an outer diameter of the hot air inlet line.

11. The heat exchanger of claim 1, wherein the cooling air inlet line is substantially parallel to the connection mast.

12. A propulsion unit for an aircraft, comprising:
a jet engine; and
a heat exchanger comprising:
a main heat exchange housing in a rectangular form, a first side of the main heat exchange housing being at least partially integral with a connection mast;
a cooling air inlet line and a hot air inlet line, wherein the hot air inlet line extends perpendicularly through the cooling air inlet line to form a heat pre-exchanger upstream of the main heat exchange housing, and wherein the hot air inlet line extends through a pyramid portion of the connection mast upstream of the heat pre-exchanger a heat pre-exchanger cooling air outlet line extending to a cooling air inlet of the main heat exchange housing, the cooling air inlet of the main heat exchange housing positioned on the first side of the main heat exchange housing; and a heat pre-exchanger hot air outlet line extending to a hot air inlet of the main heat exchange housing, the hot air inlet of the main heat exchange housing positioned on a second side of the main heat exchange housing perpendicular to the first side such that hot airflow from the hot air inlet of the main heat exchange housing and cooling airflow from the cooling air inlet of the main heat exchange housing cross at approximately a right angle within the main heat exchange housing.

13. The propulsion unit according to claim 12, wherein the main heat exchange housing is fixed to an upper face of a connection mast to attach the jet engine to an aircraft wing system.

14. The propulsion unit according to claim 13, wherein the hot air inlet line extends through a pyramid of the connection mast, the cooling air inlet line passing above the pyramid.

15. The propulsion unit according to claim 12, wherein the cooling air inlet line takes the cooling airflow in an area of bifurcation of airflows in the engine, upstream from jet engine thrust reverser covers.

16. An aircraft comprising:

at least one propulsion unit comprising a jet engine and a heat exchanger, the heat exchanger having a main heat exchange housing in a rectangular form, a first side of the main heat exchange housing being at least partially integral with a connection mast;

a cooling air inlet line and a hot air inlet line to bring a cooling airflow and a hot airflow, respectively, in the main heat exchange housing, wherein the cooling air inlet line enters the main heat exchange housing by a lower face of the main heat exchange housing and the hot air inlet line enters the main heat exchange housing by a front face of the main heat exchange housing, and a heat pre-exchanger disposed upstream from the main heat exchange housing in such a way that the cooling airflow and the hot airflow cross one another perpendicularly to each other within the heat pre-exchanger before the main heat exchange housing, wherein the heat pre-exchanger comprises a heat pre-exchanger housing distinct from the main heat exchange housing, wherein the hot air inlet line extends through a pyramid of the connection mast upstream of the heat pre-exchanger, and wherein the cooling air inlet line and the hot air inlet line both exit the heat pre-exchanger housing after crossing therewithin and enter the main heat exchange housing such that the cooling airflow and the hot airflow cross at approximately a right angle within the main housing.

17. A heat exchanger comprising:

a main heat exchange housing in a rectangular form, a first side of the main heat exchange housing being partially integral with a connection mast;

a cooling air inlet line and a hot air inlet line, wherein the cooling air inlet line extends through the hot air inlet line to form a heat pre-exchanger upstream of the main heat exchange housing, and wherein the hot air inlet line extends through a pyramid portion of the connection mast upstream of the heat pre-exchanger;

a heat pre-exchanger cooling air outlet line extending to a cooling air inlet of the main heat exchange housing, the cooling air inlet of the main heat exchanger housing positioned on the first side of the main heat exchanger housing; and a heat pre-exchanger hot air outlet line extending to a hot air inlet of the main heat exchange housing, the hot air inlet of the main heat exchange housing positioned on a second side of the main heat exchange housing perpendicular to the first side such that hot airflow from the hot air inlet of the main heat exchange housing and cooling airflow from the cooling air inlet of the main heat exchange housing cross at approximately a right angle within the main heat exchange housing.

\* \* \* \* \*